United States Patent [19]

Detenon

[11] Patent Number: 5,514,318
[45] Date of Patent: May 7, 1996

[54] PROCESS FOR MANUFACTURING ORNAMENTED PLASTIC FRAME MEMBERS FOR PICTURE FRAMES

[75] Inventor: Robert Detenon, Romford, United Kingdom

[73] Assignee: Robobond Limited, London, England

[21] Appl. No.: 243,854

[22] Filed: May 17, 1994

[30] Foreign Application Priority Data

Apr. 26, 1994 [GB] United Kingdom ............... 9408196

[51] Int. Cl.⁶ ..................... B29C 53/16; B29C 43/18
[52] U.S. Cl. ................ 264/132; 264/134; 264/292; 264/295
[58] Field of Search ........................... 264/132, 134, 264/148, 152, 259, 260, 292, 295, 339; 40/154

[56] References Cited

U.S. PATENT DOCUMENTS

| | | | |
|---|---|---|---|
| 966,372 | 8/1910 | Weiss | 264/132 |
| 2,368,085 | 1/1945 | Barbieri | 264/162 |
| 2,404,073 | 7/1946 | Karfiol et al. | 264/132 |
| 3,753,285 | 8/1973 | Gewertz | 264/152 |

*Primary Examiner*—Robert Davis
*Attorney, Agent, or Firm*—Galgano & Burke

[57] ABSTRACT

The present invention relates to a process for manufacturing frame members for picture frames and to the product of that process. The process comprises the steps of forming a plastics extrusion and cutting it into lengths and applying to the lengths of plastic extrusion a solvent based wood paste which is then moulded or otherwise shaped such that it forms ornamentation on the surface of the plastics extrusion and it is then allowed to dry. This process makes use of the low cost of extrusion plastics moulding but enables the ornamental features that would otherwise only be obtainable by injection moulding to be obtained with the extrusion moulding.

13 Claims, 1 Drawing Sheet

PROCESS FOR MANUFACTURING ORNAMENTED PLASTIC FRAME MEMBERS FOR PICTURE FRAMES

FIELD OF THE INVENTION

The present invention relates to ornamental frames (picture frames) and a process for manufacturing an ornamental frame member and to a member so formed.

BACKGROUND OF THE INVENTION

The nature of a graphic work of art (or picture) such as a painting or photographic print is such that the choice of frame within which the picture is mounted can have a profound influence on the presentation and visual impact of the work of art. Accordingly, a large industry has grown up to service the demand for custom made picture frames ranging from simple square section pine frames to elaborately carved and gilded frames of hard wood. Inevitably, however, these frames are expensive both in terms of the costs of the raw materials and the cost of crafting the material to form the desired end product.

In order to meet demand for lower cost frame members primarily for high volume sale and, most frequently, for the flaming of photographs, plastics extrusion processes have been adopted. The products of these extrusion processes are now widely available but these do suffer the disadvantage that heretofore they have been comparatively simple in form with no fine embellishment or ornamentation. Whereas injection moulds allow for the preparation of frame members or complete flames with integral ornamentation in the moulding, the cost of such processes are prohibitive for large scale manufacture.

The need therefore exists for providing a process for making picture frame members that has the advantage of high volume plastics extrusion manufacture but allows ornamentation of such extrusions.

SUMMARY OF THE INVENTION

According to a first aspect of the present invention there is provided a process for manufacturing frame members for picture frames which comprises the steps of forming a plastics extrusion and cutting it into lengths; applying to the lengths of plastics extrusion a solvent based wood paste; moulding or otherwise shaping the wood paste as or after it is applied to the plastic extrusion without reshaping the extrusion in so doing such that it forms ornamentation on the surface of the length of plastics extrusion; and allowing the paste to dry.

Suitably the solvent of the solvent based wood paste comprises toluene and acetone.

Exemplary of such wood paste is a product manufactured by Cappelini Due S.D.F. of Seregno Italy under product name wood pulp and classification IMDG CODE 3.3 Page 3372 UN N 1263 and M.M.M. CODE 3 C21.

Wood pastes of this nature are known for adorning wood but have heretofore not been contemplated for use in adorning plastics. Quite contrary to expectation wood paste of this nature adheres effectively to plastics extrusions of, for example, polystyrene to provide an attractive ornamented finish.

It is believed that the solvent etches into the plastics material and enables the paste to form resin bonds with the polymer of the plastics material. Irrespective of the mechanism by which this effect is achieved, the end result is both extremely attractive and revolutionary in the context of the picture framing industry.

As a refinement to the general technique referred to above, following application of the wood paste to the plastics extrusion and as a result of the fact that applying the paste tends to cause bowing of the extrusion lengths as the wood paste sets, it is preferred to apply straightening forces to the extrusions as the wood paste is allowed to dry.

Advantageously the extrusion lengths to which the wood paste has been applied may be rested upon support arms which each provide support toward a respective opposing end of each length with the face of the extrusion to which the paste has been applied facing upwardly and the weight of the extrusion initially causing the ends of the extrusion to bow downwardly over the support arms, whereby setting of the paste antagonises the gravitation bowing such that, when the paste is set, the extrusion lengths will be substantially straight.

To this end there is suitably provided a drying rack which comprises a pair of stands which are constrained to move together or apart along an axis and each of which has a support arm extending laterally thereof such that the support arm of each respective stand serves to support an opposing end of one or more lengths of extrusion allowing the ends of the extrusion to bow downwardly over the support arms. The support arms may be moved nearer together by moving together the stands as the paste sets, thereby enabling continuous correction for the bowing arising from the setting paste by increasing the gravitation bowing effect in the opposite direction.

According to a further aspect of the present invention there is provided a frame member produced by the process of the first aspect. According to a yet further aspect of the invention there is provided a frame formed from a plurality of said frame members.

BRIEF DESCRIPTION OF THE DRAWINGS

A preferred embodiment of the present invention will now be more particularly described by way of example with reference to the accompanying drawings wherein.

DESCRIPTION OF THE PREFERRED EMBODIMENT

Figure 1:
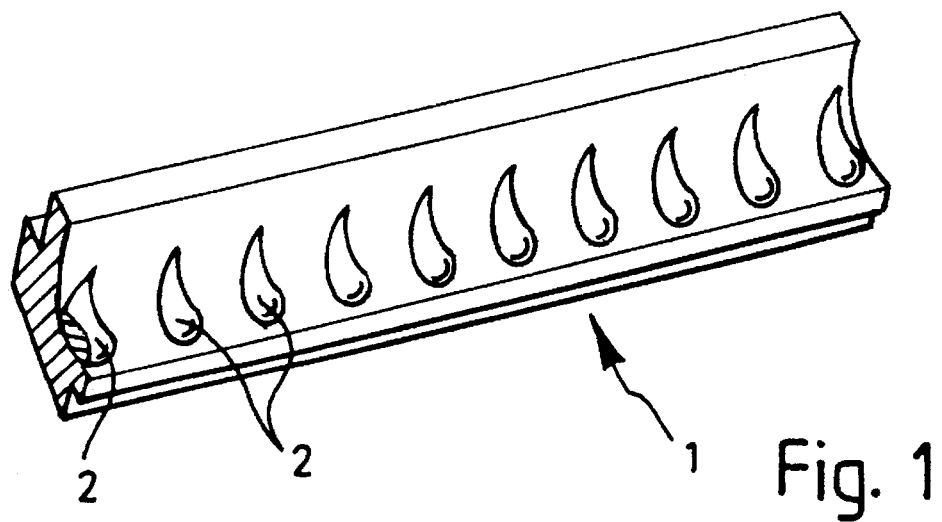
FIG. 1 is a perspective view of an embodiment of frame member.

Referring to FIG. 1, there is shown a frame member 1 comprising a length of polystyrene extrusion which is formed having a cross sectional profile suitable for a picture frame member which has been cut to a suitable length for convenient handling, storage and transportation.

As the length of extrusion is first formed by extruding through the outlet of the mould, it has a uniform cross section along its length.

The series of ornamental tear drop shaped mouldings 2 formed on the upper face of the extrusion are applied to the extrusion after the extrusion process has taken place.

The ornamental mouldings 2 are prepared from a solvent-based wood pulp or paste of a type as generally known in the wood crafting industry.

Suitable wood pastes or pulps for the purpose include those manufactured by an Italian company Cappelini Due S.D.F. of Seregno Italy under product classification IMDG CODE 3.3 Page 3372 UN N 1263 and M.M.M. CODE 3 C21. The example wood paste comprises the solvents acetone and toluene which react with a polystyrene extrusion to etch into the plastics material and bond closely therewith. From the nature of the solvents used in this particular paste care must be taken in its use and ideally masks/goggles worn during its handling to protect from the toxic vapours.

The paste may be applied in a mould which is placed atop the length of plastics extrusion but preferably is applied by squirting from a dispenser which is automated and programmed to dispense the paste in a pattern.

An extractor fan is suitably mounted above the paste application facility within a hood extending over the facility, to draw off the solvent vapour as soon as the paste is applied and suitably for a resting period of three to four minutes thereafter. This has been found to drastically reduce the subsequent drying time.

Once the paste has been applied as desired it must then be allowed to dry over a period of days and in doing so it will tend to tension the upper surface of the length of extrusion to which it has been applied causing the length to bow upwardly at the ends. This effect may be countered by pre-stressing the lengths in the opposing direction.

Figure 2:
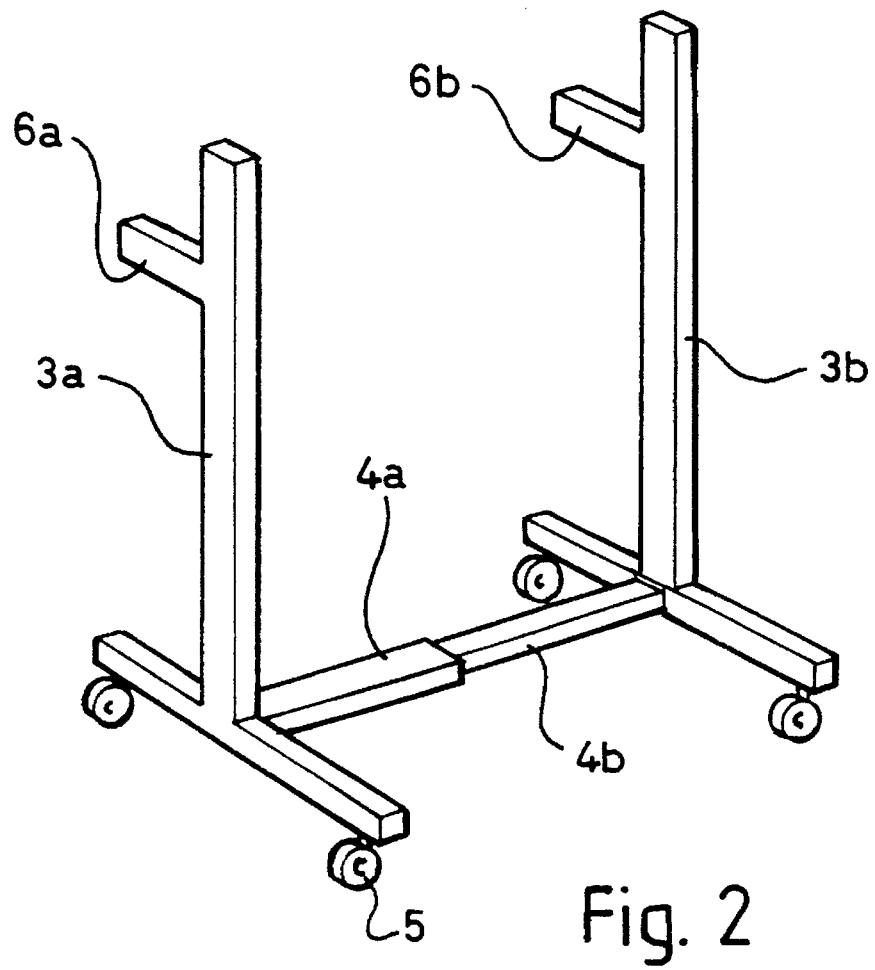
FIG. 2 is a perspective view of a drying rack for use in the manufacturing process.

Referring to FIG. 2, a drying rack is illustrated which comprises two substantially symmetrical stand members 3a, 3b on castor wheel 5 which are held substantially parallel to each other and constrained to move together or apart by means of a telescopic linkage 4a, 4b. Each stand member has an arm 6a, 6b extending laterally from an upper end thereof to support the lengths of extrusion which are mounted thereon extending therebetween.

Initially the two stand members 3a, 3b will be positioned apart and as the paste dries, with evaporation of the solvent, the lengths of extrusion will begin to bow upwardly at the ends. To counter this the stand members 3a, 3b may then be moved nearer together, allowing the weight of the extrusions to cause their ends to sag over the arms 6c, 6b. The separation is suitably reduced in stages during the drying process.

To further reduce the duration of the drying period extractor fans are suitably provided in the drying room. These assist in the drying process although it has been found that use of extractor fans at time of application is the single most effective measure to reduce drying time.

I claim:

1. A process for manufacturing ornamented extruded plastic frame members for picture frames which process comprises the steps of:

forming a plastic extrusion;

cutting said plastic extrusion into lengths;

applying to the plastic extrusion a solvent based wood pulp paste;

moulding or shaping the wood pulp paste as or after it is applied to the plastic extrusion without reshaping the extrusion in so doing such that the wood pulp paste forms ornamentation on the surface of the plastic extrusion; and allowing the wood pulp paste to dry.

2. A process as claimed in claim 1, wherein the solvent of the solvent based wood pulp paste comprises toluene and acetone.

3. A process as claimed in claim 1 wherein during the step of allowing the wood pulp paste to dry one or more extractor fans are used to draw off solvent vapours.

4. A process as claimed in claim 3 wherein said extractor fan is operated over the extrusion as the wood pulp paste is applied.

5. A process as claimed in claim 1, wherein during the step of allowing the wood pulp paste to dry straightening forces are applied to the length of extrusion to counteract bowing.

6. A process as claimed in claim 5, wherein during the step of allowing the wood pulp paste to dry each length of extrusion is rested upon support arms which each provide support toward a respective opposing end of the length with the face of the extrusion to which the paste has been applied facing upwardly and the weight of the extrusion initially causing the ends of the extrusion to bow downwardly over the support arms, whereby setting of the paste antagonises the gravitational bowing such that when the paste is set the extrusion lengths will be substantially straight.

7. A process as claimed in claim 6, wherein there is provided a drying rack which comprises a pair of stands which are constrained to move together or apart along an axis and each of which has a said support arm extending laterally therefrom such that the support arm of each respective stand serves to support an opposing end of one or more lengths of extrusion during the step of allowing the wood pulp paste to dry; and as the wood pulp paste dries the pair of stands are moved together.

8. A process as claimed in claim 1, wherein said forming step produces a plastic extrusion of uniform cross-section and said molding step results in a plastic extrusion of uniform cross-section having ornamentation on the surface thereof.

9. A process as claimed in claim 1, wherein the plastic extrusion is cut into lengths after it is formed and before the solvent based wood pulp paste is applied.

10. A process as claimed in claim 1, in which the wood pulp paste is applied to the plastic extrusion by a dispenser which dispenses the wood pulp paste in a programmed pattern.

11. A process for manufacturing ornamented extruded plastic frame members for picture frames which process comprises the steps of:

forming a plastic extrusion;

cutting said plastic extrusion into lengths;

applying to the plastic extrusion a solvent based wood pulp paste;

moulding or shaping the wood pulp paste as or after it is applied to the plastic extrusion such that the wood pulp paste forms ornamentation on the surface of the plastic extrusion; and allowing the wood pulp paste to dry while applying straightening forces to the length of extrusion to counteract bowing.

12. A process as claimed in claim 10, wherein during the step of allowing the wood pulp paste to dry, each length of extrusion is rested upon support arms which each provide support toward a respective opposing end of the length with the face of the extrusion to which the paste has been applied facing upwardly and the weight of the extrusion initially causing the ends of the extrusion to bow downwardly over the support arms, whereby setting of the paste antagonizes the gravitational bowing such that when the paste is set, the extrusion lengths will be substantially straight.

13. A process as claimed in claim 12, wherein there is provided a drying rack which comprises a pair of stands which are constrained to move together or apart along an axis and each of which has said support arm extending laterally therefrom such that the support arm of each respective stand serves to support an opposing end of one or more lengths of extrusion during the step of allowing the wood pulp paste to dry; and as the wood paste dries, the pair of stands are moved together.

* * * * *

REEXAMINATION CERTIFICATE (3599th)
United States Patent [19]
Detenon

[11] B1 5,514,318
[45] Certificate Issued Aug. 11, 1998

[54] PROCESS FOR MANUFACTURING ORNAMENTED PLASTIC FRAME MEMBERS FOR PICTURE FRAMES

[75] Inventor: Robert Detenon, Romford, United Kingdom

[73] Assignee: Robobond Limited, London, England

Reexamination Request:
No. 90/004,628, Apr. 30, 1997

Reexamination Certificate for:
Patent No.: 5,514,318
Issued: May 7, 1996
Appl. No.: 243,854
Filed: May 17, 1994

[30] Foreign Application Priority Data

Apr. 26, 1994 [GB] United Kingdom ............ 9408196

[51] Int. Cl.⁶ .................... B29C 43/18; B29C 53/16
[52] U.S. Cl. ............... 264/132; 264/134; 264/292; 264/295; 428/14
[58] Field of Search .................. 264/132, 134, 264/292, 295; 428/14

[56] References Cited

FOREIGN PATENT DOCUMENTS 57-31526  2/1982  Japan .

*Primary Examiner*—Robert Davis

[57] ABSTRACT

The present invention relates to a process for manufacturing frame members for picture frames and to the product of that process. The process comprises the steps of forming a plastics extrusion and cutting it into lengths and applying to the lengths of plastic extrusion a solvent based wood paste which is then moulded or otherwise shaped such that it forms ornamentation on the surface of the plastics extrusion and it is then allowed to dry. This process makes use of the low cost of extrusion plastics moulding but enables the ornamental features that would otherwise only be obtainable by injection moulding to be obtained with the extrusion moulding.

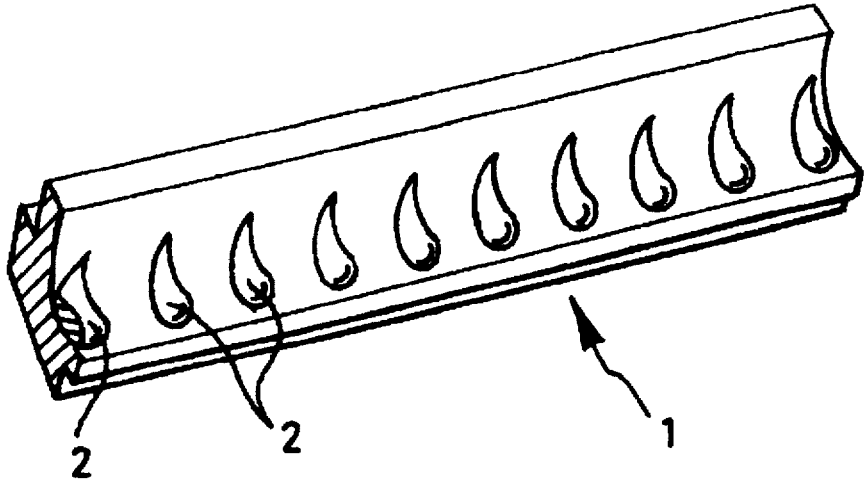

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 5,6,7 and 11 is confirmed.

Claim 1 is cancelled.

Claims 2,3 8,9 and 10 are determined to be patentable as amended.

Claims 4,12 and 13 dependent on an amended claim are determined to be patentable.

2. A process as claimed in claim [1] *5*, wherein the solvent of the solvent based wood pulp paste comprises toluene and acetone.

3. A process as claimed in claim [1] *5* wherein during the step of allowing the wood pulp paste to dry one or more extractor fans are used to draw off solvent vapours.

5. A process as claimed in claim 1, wherein during the step of allowing the wood pulp paste to dry straightening forces are applied to the length of extrusion to counteract bowing.

8. A process as claimed in claim [1] *5*, wherein said forming step produces a plastic extrusion of uniform cross-section and said molding step results in a plastic extrusion of uniform cross-section having ornamentation on the surface thereof.

9. A process as claimed in claim [1] *5*, wherein the plastic extrusion is cut into lengths after it is formed and before the solvent based wood pulp paste is applied.

10. A process as claimed in claim [1] *5*, in which the wood pulp paste is applied to the plastic extrusion by a dispenser which dispenses the wood pulp paste in a programmed pattern.

\* \* \* \* \*